United States Patent [19]
Stenkvist

[11] Patent Number: 5,274,663
[45] Date of Patent: Dec. 28, 1993

[54] DIRECT-CURRENT ARC FURNACE PLANT

[75] Inventor: Sven-Einar Stenkvist, Brugg, Switzerland

[73] Assignee: Asea Brown Boveri Ltd., Baden, Switzerland

[21] Appl. No.: 897,824

[22] Filed: Jun. 12, 1992

[30] Foreign Application Priority Data

Jun. 14, 1991 [CH] Switzerland ............ 1782/91

[51] Int. Cl.⁵ .................................. H05B 7/11
[52] U.S. Cl. ........................... 373/103; 373/72; 373/101; 373/102; 373/108
[58] Field of Search .......... 373/72, 71, 101–103, 373/108

[56] References Cited

U.S. PATENT DOCUMENTS

| | | | |
|---|---|---|---|
| 4,018,974 | 4/1977 | Andersson et al. | 373/72 |
| 4,038,483 | 7/1977 | Stenkvist | 373/72 |
| 4,228,314 | 10/1980 | Stenkvist | 373/72 |
| 4,403,328 | 9/1983 | Lassander et al. | 373/103 |
| 4,550,413 | 10/1985 | Lassander et al. | |
| 4,577,326 | 3/1986 | Bergman et al. | |
| 4,606,055 | 8/1986 | Lassander et al. | 373/108 |
| 4,821,284 | 4/1989 | Janiak et al. | 373/107 |
| 4,856,021 | 8/1989 | Janiak et al. | 373/108 |
| 5,134,628 | 7/1992 | Stenkvist | 373/107 |

FOREIGN PATENT DOCUMENTS

| | | |
|---|---|---|
| 90116866.6 | 9/1990 | European Pat. Off. . |
| 2558879 | 5/1984 | Fed. Rep. of Germany . |
| 4035233 | 5/1991 | Fed. Rep. of Germany . |
| 2548508 | 4/1985 | France . |
| 2094119 | 9/1982 | United Kingdom ... 2,108,810/GBX |

Primary Examiner—Bruce A. Reynolds
Assistant Examiner—Tu Hoang
Attorney, Agent, or Firm—Oblon, Spivak, McClelland, Maier & Neustadt

[57] ABSTRACT

In direct-current arc furnace the arc is deflected in a direction away from the current supply means (19) through the action of the high-current lines (18) extending under the furnace vessel. This leads to the thermal overloading of a part of the furnace vessel walls. If the high-current lines (18a) are for the major part laid in a plane above the furnace bottom, on or below the furnace platform (20), and are taken downwards to the connection fittings (10) on the furnace bottom only on the side of the furnace vessel (1) opposite the current supply means, the arc will again burn symmetrically.

5 Claims, 4 Drawing Sheets

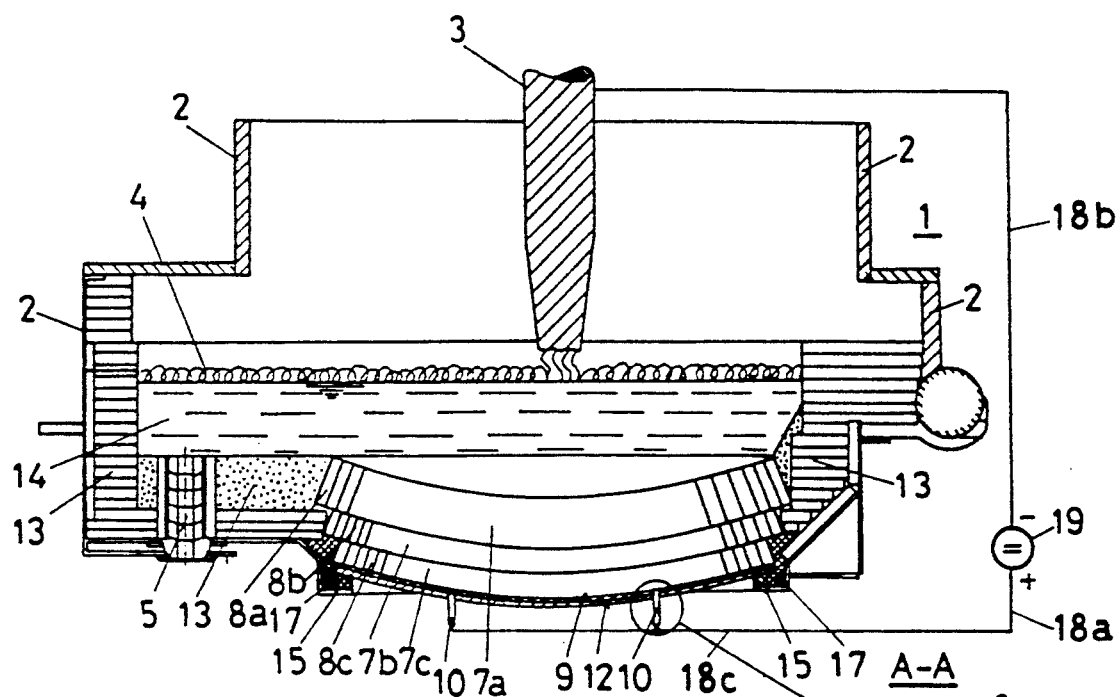
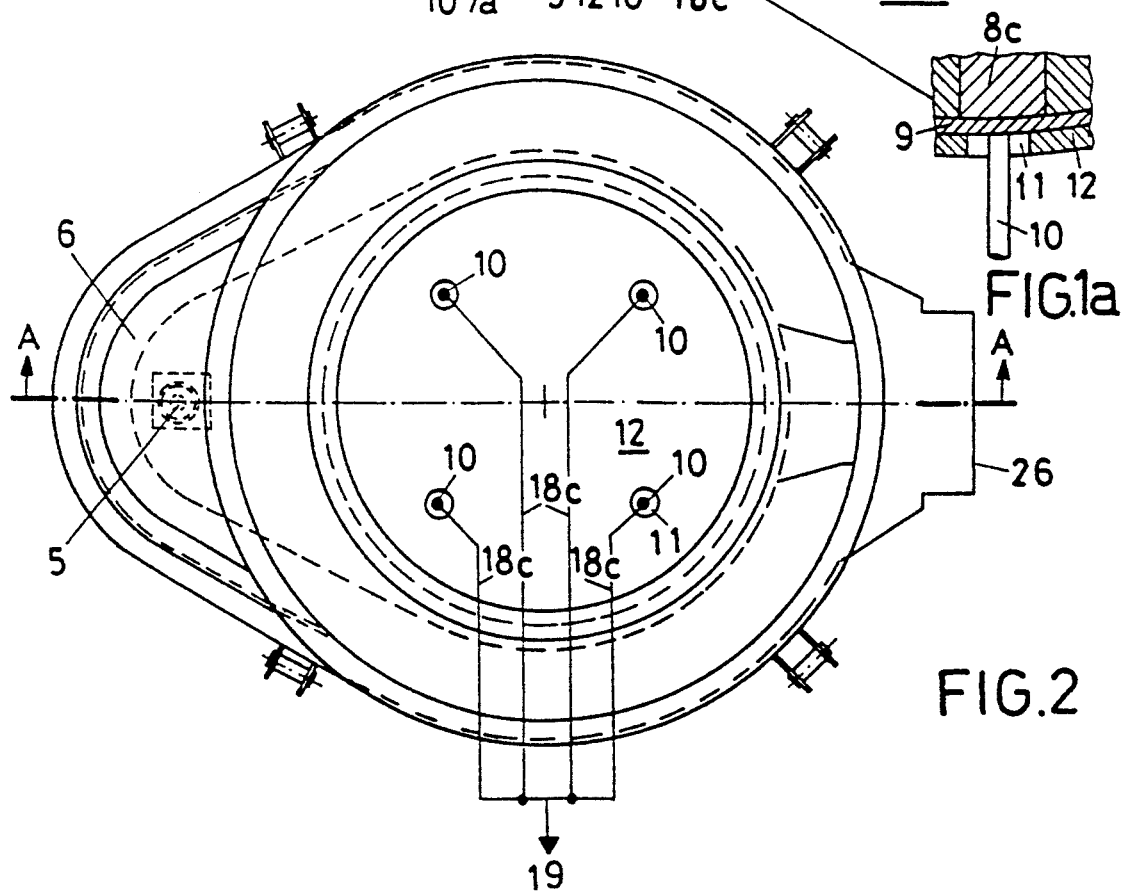

DIRECT-CURRENT ARC FURNACE PLANT

BACKGROUND OF THE INVENTION

1. Field of the Invention

The invention relates to a direct-current arc furnace plant comprising a direct-current arc furnace which is disposed on a furnace platform and comprises a furnace vessel surrounded, by a metal shell, at least one electrode connected as a cathode and at least one bottom contact connected as anode and provided with at least one connection fitting, the electrode and the bottom contact being connected via high-current lines to a current supply means disposed alongside the furnace vessel.

In this connection, the invention makes reference to a prior art as revealed, for example, in German Patent 2,558,879.

2. Discussion of Background

In high-power direct-current arc furnaces the high currents flowing in the incoming and outgoing current lines cause deflections of the arc. The arc does not burn vertically. On the contrary, the arc is directed towards the furnace wall and there leads to overheating.

Special guiding of the high-current lines under and at the side of the furnace vessel enables a "centering" of the arc to be achieved. Thus, in U.S. Pat. No. A-4,550,413 and U.S. Pat. No. A-4,557,326 it is proposed to lay these lines in such a way that the magnetic fields produced by the direct current flow act symmetrically on the arc. These measures are, however, expensive and, in addition to the cost, increase the space required for the furnace. Another solution consists in making the electrode, together with the electrode mounting, horizontally movable relative to the furnace vessel, in order thus to compensate for asymmetry in the incoming and outgoing current lines. This measure is also very expensive, because space must accordingly be made in the furnace roof for the path of travel of the electrode.

From German Patent 25 58 879 a direct-current fed arc furnace is known which has a furnace crucible with a nonmagnetic bottom. The bath electrode is disposed asymmetrically in relation to the longitudinal direction of the arc electrode. The high-current lines leading to the bath electrode are disposed in such a manner that at least one conductor is laid under the furnace crucible in a direction such that the current flowing through it flows substantially in the opposite direction to the current in the melt. In order to achieve this current flow, in the known arc furnace the high-current conductors must be disposed high at the top of the crucible, horizontally around the periphery of the furnace crucible. These sections of the high-current conductors thus form a part of the furnace vessel. For operation in the manner customary at present with interchangeable vessels this increases the cost of the vessel. In addition, the protection of these high-current lines on the crucible is expensive.

In another solution, which is the subject of the Applicant's as yet unpublished European Patent Application No. 90116866.6 of Sep. 3, 1990, it is proposed to construct the bottom lining layer of bricks of various conductivities.

SUMMARY OF THE INVENTION

The problem underlying the invention is that of providing a direct-current arc furnace plant in which, with simple means, symmetrization of the arc is achieved without increasing the space required for the plant, in which no compensating conductors have to be installed on the furnace vessel, and in which use can as previously be made of interchangeable vessels.

According to the invention this problem is solved by the fact that the high-current lines leading from the current supply means to the bottom contact are laid for the major part in a plane above the furnace bottom, above, on or below the furnace platform, and are taken downwards to the connection fittings on the furnace bottom only on the side of the furnace vessel opposite the current supply means.

The advantage of the invention is to be seen in particular in that a nearly symmetrical arc is formed without expensive guiding of the lines on, under or at the side of the furnace vessel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a longitudinal section through a direct-current arc furnace, with the high-current lines shown schematically;

FIG. 2 is a plan view of the furnace vessel bottom of the arc furnace shown in FIG. 1;

DESCRIPTION OF THE PREFERRED EMBODIMENTS

Figure 3:
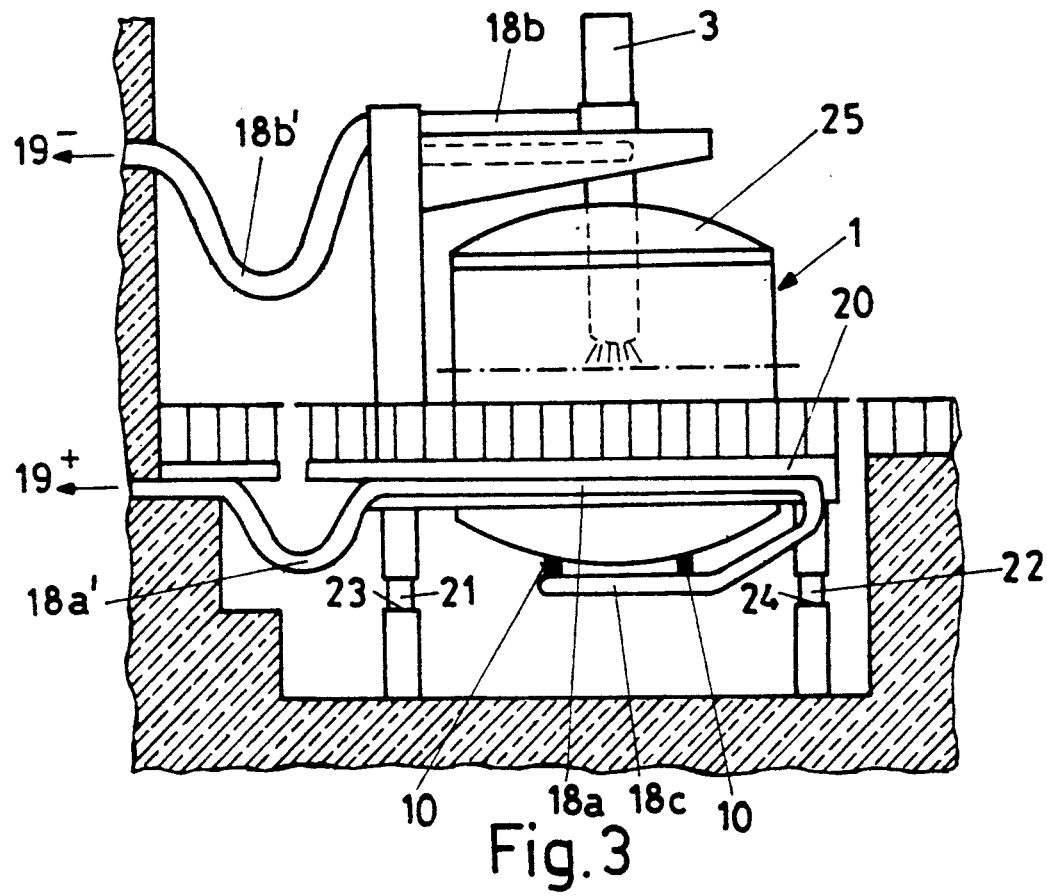
FIG. 3 is a greatly simplified side view of a direct-current arc furnace plant containing an arc furnace according to FIG. 1, disposed on a furnace platform, and having high-current conductors guided on both sides under the furnace platform.

Referring now to the drawings, wherein like reference numerals designate identical or corresponding parts throughout the several views, in FIG. 1 a direct-current arc furnace is shown which has a furnace vessel 1 provided with a shell 2 of metal. In the exemplary embodiment the furnace has only one solid electrode 3 connected as a cathode, but this number may also amount to two, three or more. Under the electrode 3 an electrode spot, that is to say a slag-free area of the melt, is obtained in the usual way. The furnace has eccentric bottom tapping, with a tapping device 5 and a doorhole 6. A bottom contact is disposed in the furnace base. The bottom contact consists, in the case of the example, of two lining layers 7a, 7b of graphite or graphite-containing bricks 14 resting on a dome-shaped contact plate 8. Connection fittings 9 (FIG. 2) on the contact plate 8 project downwards through openings in the vessel bottom 10 into the atmosphere. The bottom lining layer is followed in the outward direction by the conventional furnace masonry 11. The vessel bottom 10 may be provided with cooling means (not shown) in order to keep it at the lowest possible temperature. The bricks 14 of the lining layers 7a and 7b serve as current conductors between the charge 15 and the contact plate 8.

To this extent the direct-current arc furnace corresponds to the prior art and is described in detail, for example, in U.S. Pat. No. 4,228,314 and also in German Patent 30 22 566.

The shell 2 of the furnace vessel is narrowed radially inwards and forms an inwardly projecting collar 15. The bottom plate 10 projects beyond the collar 15 in the radial direction. In the overlap region a ring 17 of insulating material is disposed. In this way the entire bottom part of the furnace is supported on the collar 15. The bottom part of the furnace floats so-to-speak in the furnace vessel 1. At the same time the insulating material effects the electrical insulation between the furnace shell 2 and the bottom plate 10 (and consequently the bottom contact).

The distribution of the connection fittings 10 can be seen in the plan view of the underside of the furnace vessel 1 shown in FIG. 2. Four fittings 9 distributed regularly over the bottom and the high-current lines 18a and 18c to the positive pole of the current supply means 19 can be seen. The high-current lines leading from the negative pole of the current supply means 19 to the electrode 3 are designated 18b.

Figure 4:
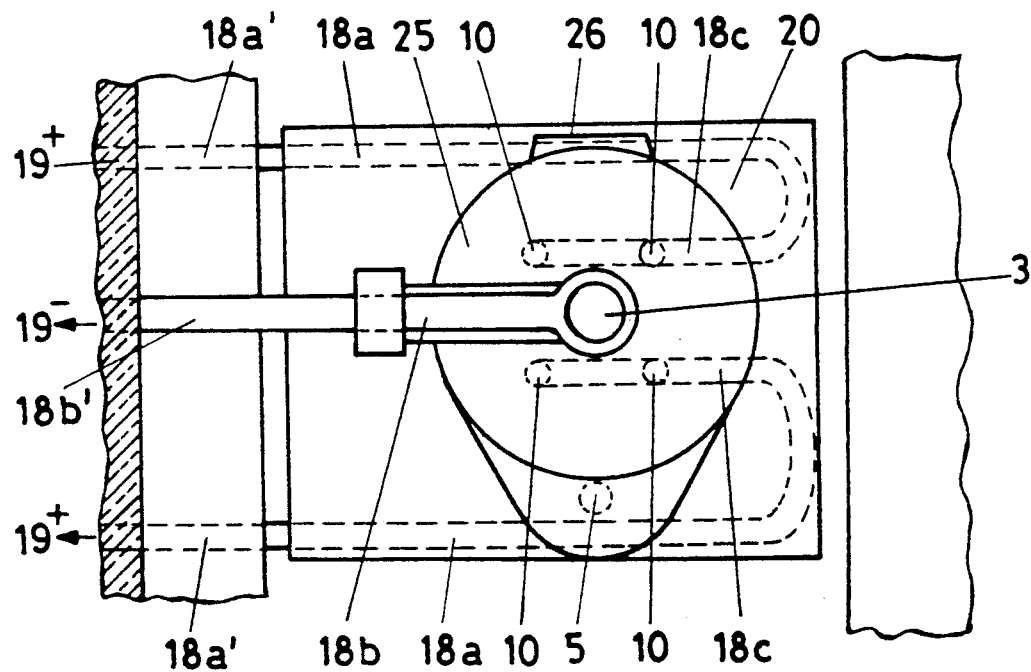
FIG. 4 is a greatly simplified plan view of the direct-current arc furnace plant according to FIG. 3.
Figure 5:
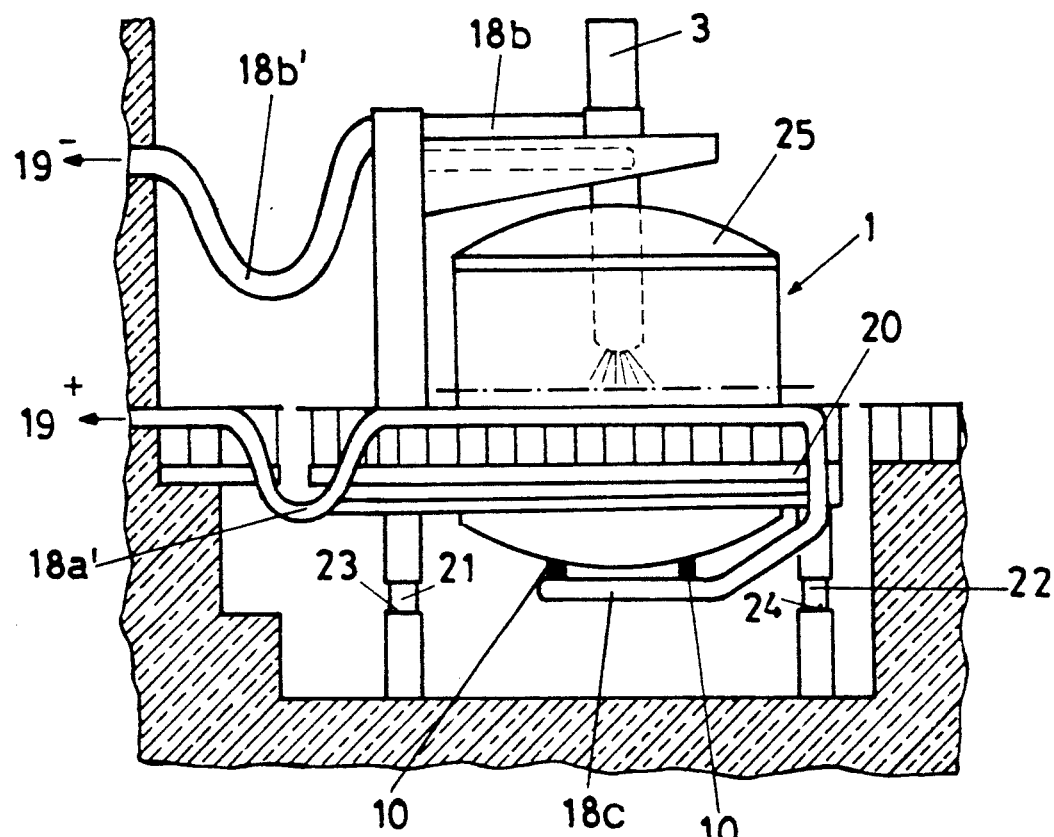
FIG. 5 is a greatly simplified side view of a direct-current arc furnace plant containing an arc furnace according to FIG. 1, disposed on a furnace platform, and having high-current conductors guided above the furnace platform only on the pouring side.
Figure 6:
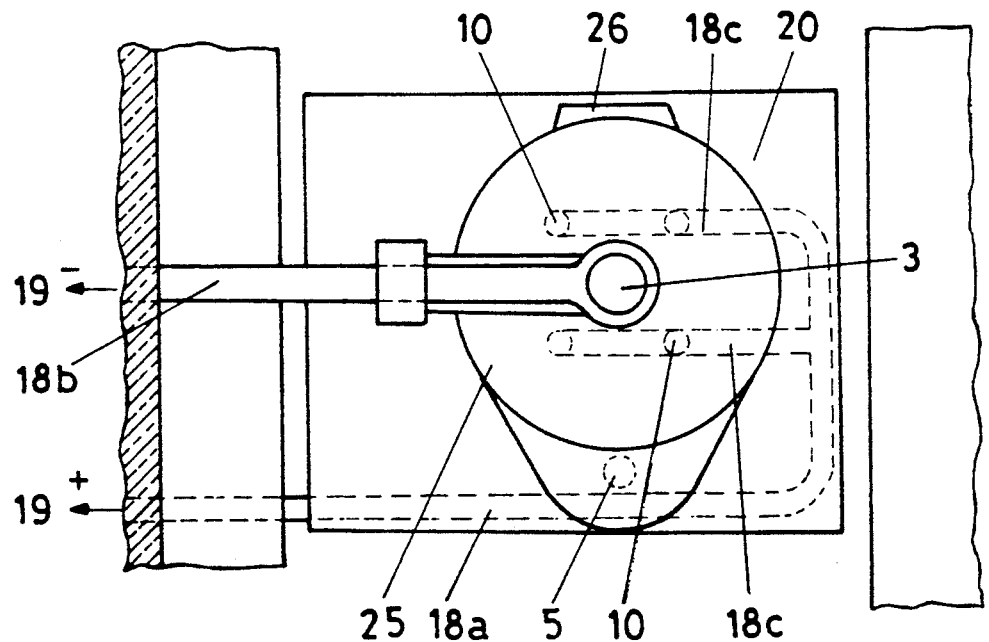
FIG. 6 is a greatly simplified plan view of the direct-current arc furnace plant according to FIG. 5.

As can be seen in FIGS. 3 and 4 and in FIGS. 5 and 6 respectively, the direct-current arc furnace is disposed on a furnace platform 20. This platform is provided with two rolling cradles 21, 22 resting on rolling tracks 23, 24. In this way the arc furnace, together with the furnace platform 20, can swivel towards both sides about an axis parallel to the longitudinal axis of the furnace. The high-current lines 18a, 18b leading to the electrode 3 and also to the connection fittings 10 on the furnace bottom are of flexible construction at the transition to the furnace platform 20. The flexible portions of the high-current lines 18a and 18b are designated 18a' and 18b' respectively. The high-current lines 18a leading from the current supply means 19 (not shown in FIGS. 3 and 4) to the connection fittings 10 of the bottom contact are for the most part laid in a plane above the furnace bottom under the furnace platform 20. Only on the side of the furnace vessel opposite the current supply means 19 are they taken downwards to the connection fittings 10 on the furnace bottom. In this connection two variants for the arrangement of the high-current lines 18a are possible:

In the variant shown in FIGS. 3 and 4 two separate lines coming from the positive pole of the current supply means 19 are laid along the edge of the furnace platform 20. The conduits (not shown in FIGS. 3 and 4) used to protect the high-current lines 18a can be integrated into the construction of the furnace platform 20. On the side of the furnace platform 20 opposite the current supply means 19 they first extend in the same plane towards one another and then merge into line portions which extend obliquely downwards and whose ends are connected to the connection fittings 10 on the furnace bottom.

The portions 18c which extend on the side of the furnace facing away from the current supply means 19, and which first lead downwards and then, under the furnace bottom, back in the direction of the conductor portions 18a, which extend on the furnace platform 20, to the connection fittings 10, produce a magnetic field which counteracts the deflection of the arc and thus reduces wear on the furnace wall and furnace roof. The high-current line portions 18a extending horizontally on the furnace platform 20 certainly do bring about a deflection of the arc, but this deflecting action is the smaller, the higher the position, relative to the furnace bottom, of the high-current line portions 18a extending in the plane above the furnace bottom. In this respect the optimum position would be in the plane of the arc with a full furnace (indicated by the dot-dash line in FIG. 3). For practical purposes, however, it must be borne in mind that the high-current lines 18a must be protected against the extreme conditions prevailing during the operation of the arc furnace. This applies both to the region of the pouring device 5 and also, in particular, to the region of the slag door 26. If this is economically and technically acceptable, in an arc furnace plant according to FIGS. 3 and 4 said portions of the high-current lines 18a can be laid above the furnace platform 20, for which purpose a separate carrier device and appropriate protective measures are necessary.

Another possible arrangement, which in respect of its electromagnetic properties is only slightly less effective but which can be produced more economically, is shown by way of example in FIGS. 5 and 6. Here a high-current line 18a (or a plurality of such lines connected in parallel) leads from the positive pole of the current supply means 19, only on the pouring side of the furnace platform 20, to the end of the arc furnace opposite the current supply means 19, then bends inwards towards the center of the furnace platform and branches at the height of the first pair of connection fittings 10. The two branches are then connected to the fittings 10. The arrangement of the lines on the furnace platform is so selected that these portions of the high-current line 18a preferably extend in a plane which corresponds approximately to that in the arc burning plane with a full charge. The magnetic field produced by these conductor portions extends substantially vertically in the region of the arc and brings about no disturbing deflection of the arc. Although the arrangement of the lines on the tapping side of the furnace platform 20 appears the most appropriate, the high-current line 18a may also be disposed on the side where the slag door 26 is disposed, without any variation of the intended compensation effect.

Figure 7:
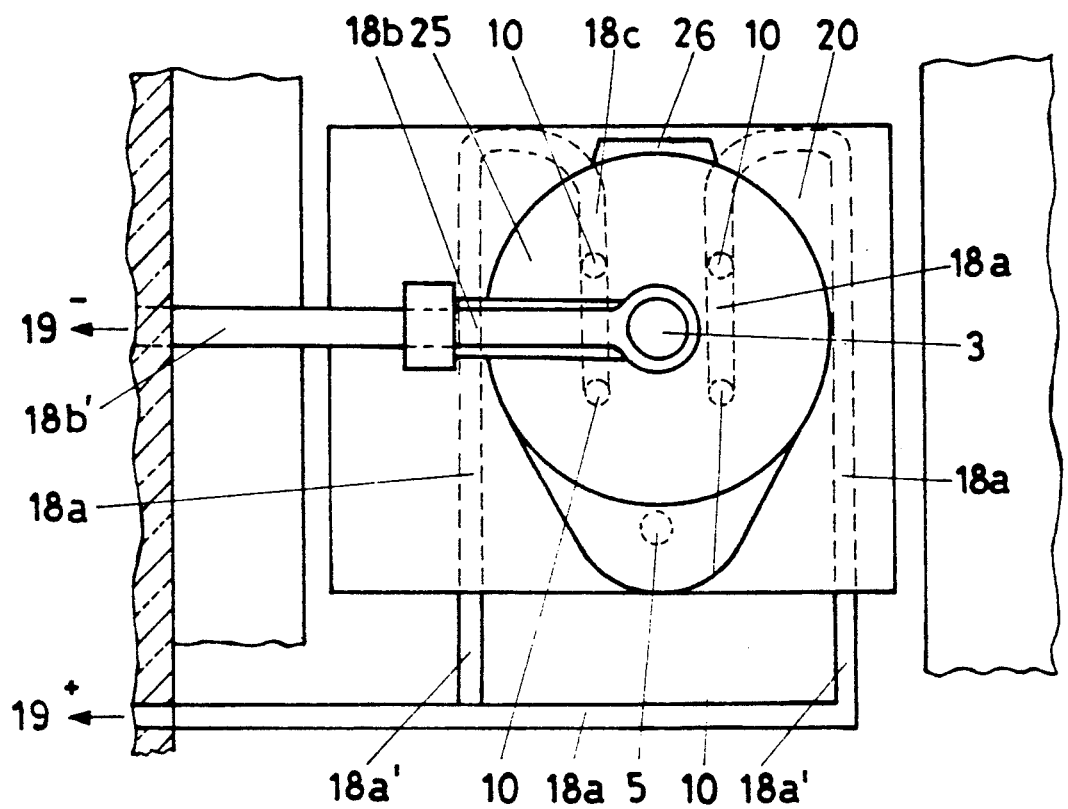
FIG. 7 shows a modification of the embodiment according to FIG. 3 or 4 having high-current lines which are laid on the furnace platform transversely to the tipping direction.

The examples of the embodiments described above were based on a direct-current arc furnace plant of conventional type, that is to say an arrangement in which the current supply means is disposed laterally in the direction of the tipping axis of the furnace vessel and both the high-current lines 18a, 18b leading to the positive pole and those leading to the negative pole of the current supply means 19 and the appertaining flexible portions 18a' and 18b' extend for the most part parallel to the tipping axis of the arc furnace. The embodiment of the invention illustrated by way of example in FIG. 7 differs from this arrangement in that the portions mounted on or under the furnace platform 20 extend for the most part at right angles to the tipping axis, as do now also the appertaining flexible portions 18a' of the high-current lines leading to the positive pole of the current supply means 19. In respect of the compensation action the effect achieved is no different from that of the arrangement of the high-current lines 18a in accordance with FIGS. 3 and 4. As in the case of the configuration according to FIGS. 5 and 6, the high-current lines may if desired also be laid above the furnace platform. In an arrangement of the conductors according to FIG. 7 it is an advantage that no lines have to be laid either in the region of the slag door 26 or in the region of the bottom tap device 5. It could be regarded as a disadvantage that the length of the lines to the connection fittings 10, which face away from the current supply means 19, is greater. This can however be avoided when using a conductor arrangement similar to FIGS. 5 and 6 by omitting the "long" line in question and also feeding the pair of fittings facing away from the current supply means 19 via the high-current line close to the current supply means 19.

The invention has been described above with reference to a furnace construction in which the bottom contact consists at least in part of electrically conductive bricks resting on a contact plate which in turn lies on a bottom plate. The invention is obviously not restricted to such types of furnace. Without departing from the scope of the invention, the latter may also be applied to direct-current arc furnaces in which the bottom contact consists of a multiplicity of metal rods fastened vertically on the bottom plate. The bottom contact may also be provided with fewer or more than four connection fittings.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A direct-current arc furnace disposed on a furnace platform, and comprising:
   a furnace vessel surrounded by a metal shell;
   at least one electrode connected as a cathode;
   at least one bottom contact connected as an anode and provided with at least one connection fitting;
   current supply means disposed alongside the furnace vessel;
   a high-current line connecting the at least one connection fitting to the current supply means, wherein a portion of the high-current line leads from the current supply means across the furnace vessel to the at least one connection fitting in a plane above the furnace bottom, and wherein said portion is taken downward to the at least one connection fitting only on a side of the furnace vessel opposite to the current supply means.

2. The arc furnace according to claim 1, wherein the high-current line extends only on a pouring side of the furnace vessel.

3. The arc furnace according to claim 2, wherein the high-current line is guided laterally along the furnace vessel and at right angles to the furnace vessel.

4. The arc furnace according to any one of claims 1 to 8, wherein the high-current line is laid on the furnace platform in a plane which corresponds approximately to a plane in which an arc burns with a full charge.

5. The arc furnace according to any one of claims 1 to 8, wherein the high-current line is laid above the furnace platform in a plane which corresponds approximately to a plane in which an arc burns with a full charge.

* * * * *